J. C. SPARKS.
FERTILIZER DISTRIBUTER.
APPLICATION FILED AUG. 10, 1911.

1,032,959.

Patented July 16, 1912.

John C. Sparks,
Inventor by C. A. Snow & Co.
Attorneys

UNITED STATES PATENT OFFICE.

JOHN C. SPARKS, OF HARTSVILLE, SOUTH CAROLINA.

FERTILIZER-DISTRIBUTER.

1,032,959.  Specification of Letters Patent.  Patented July 16, 1912.

Application filed August 10, 1911. Serial No. 643,432.

*To all whom it may concern:*

Be it known that I, JOHN C. SPARKS, a citizen of the United States, residing at Hartsville, in the county of Darlington and State of South Carolina, have invented a new and useful Fertilizer - Distributer, of which the following is a specification.

This invention has relation to fertilizer distributers and it consists in the novel construction and arrangement of its parts as hereinafter shown and described.

The object of the invention is to provide a distributer of the character as indicated of special construction.

The fertilizer distributer consists primarily of a hopper having an outlet with coöperating valves located in planes one above the other, one of said valves being capable of adjustment to approximately regulate the hopper outlet and the other valve adapted to be moved to close the hopper outlet and a lever mechanism coöperating with the last said valve. Each of said valves is provided with a rearwardly extending shank which in turn is provided with elongated registering perforation. A bolt passes through said perforations and a cross piece receives said bolt. Said bolt is provided with a shoulder which impinges the shank of the upper valve against the cross piece while the shank of the lower valve is free for longitudinal movement with relation to the bolt.

Figure 1:
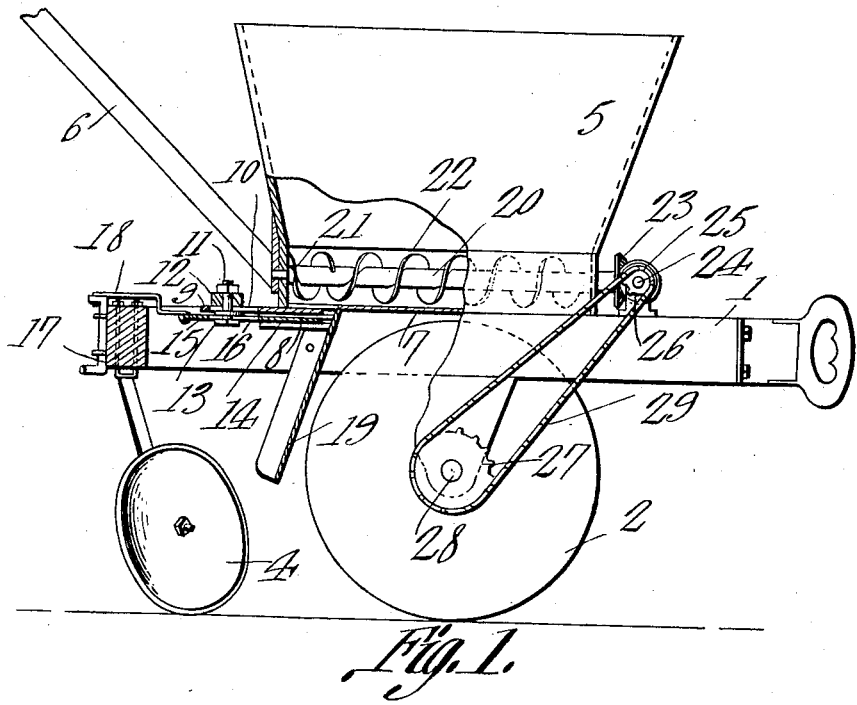
Figure 2:
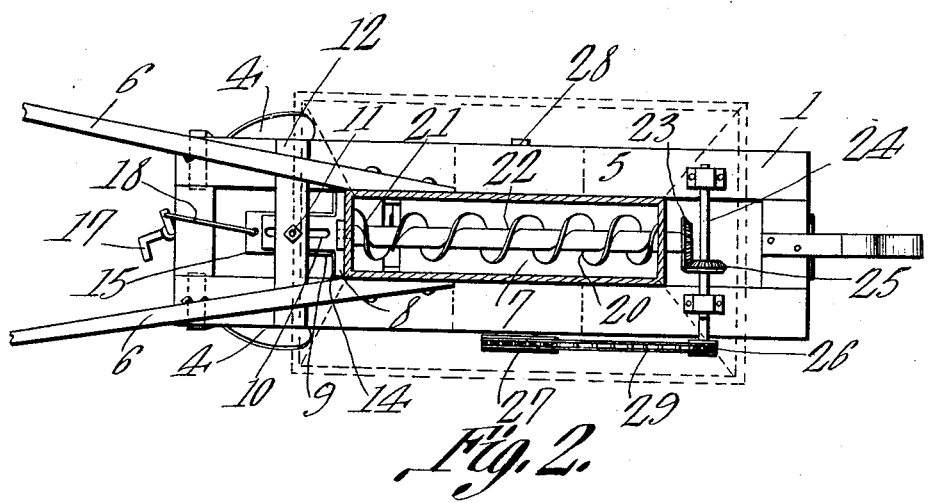

In the accompanying drawing:—Figure 1 is a side elevation of the fertilizer distributer with parts broken away. Fig. 2 is a top plan view partly in section.

A frame 1 is mounted upon the axle of the wheel 2. Said wheel is provided with a broad periphery and is thereby enabled to pass over the surface of a furrow without sinking into the surface of the soft earth and adding draft to the implement. The listing disks 4, 4 are located to the rear of the said follow wheel 2. The implement is provided with a swiveled tongue (not shown) by means of which the implement may be readily turned at the end of a row and at the same time the implement may be brought to the end of a row.

The hopper 5 is superimposed upon the frame 1. The handles 6 are suitably secured at their lower ends to the said hopper 5 and the frame 1. The bottom 7 of the said hopper 5 extends from one end thereof and terminates short of the opposite end of the said hopper. The valve 8 extends from the rear end of the hopper 2 toward the forward end of the bottom 7 thereof. The shank 9 of the said valve is provided with an elongated perforation 10 which receives the bolt 11 which in turn passes through the cross-piece 12 attached to the frame 1. The said bolt 11 is provided with a shoulder 13 which, when the nut upon the bolt 11 is tightened, clamps the shank 9 of the said valve 8 against the cross-piece 12 and fixes the said valve 8 with relation to the bottom 7. By adjusting the said valve 8 and securing the same, the space between the edge of said valve and the edge of the bottom 7 forms the outlet of the hopper 5 and said outlet is located intermediate of the ends thereof. The valve 8 is adjusted to approximately regulate the capacity of the hopper outlet. The valve 14 is located under the valve 8 and is adjustable at all times and is intended to be used to regulate the capacity of the hopper outlet to a nicety or completely check the flow of material through the same. The said valve 14 is provided with a shank 15 which in turn is provided with an elongated slot 16 that receives the portion of the bolt 11 located between the shoulder 13 and the bolt head.

The foot lever 17 is fulcrumed to the rear end of the frame 1 and the link 18 connects the work end of the said lever 17 with the end of the shank 15. It will thus be seen that the operator may at any time throw his foot up and trip the lever 17 which will cause the valve 14 to slide and close the opening of the hopper 5. This is desirable when the implement is crossing roads or is making turns, etc. The chute 19 is located under the opening in the bottom of the hopper and conveys the material down in between the listing disks 4.

The shaft 20 is journaled in the hopper 5 and extends longitudinally thereof. Said shaft is provided at one end with a worm 21 which is disposed in one direction and at its other end with the worm 22 which is disposed in the opposite direction. Consequently, as the said shaft is rotated, the said worms 21 and 22 work the material from the ends of the hopper toward the outlet which is located intermediate of the ends and thus the material is not banked up at either end of the hopper. The forward end of the shaft 20 is provided with a bevel gear wheel 23. The shaft 24 is journaled to the frame 1 and extends transversely thereof. The bevel gear 25 is fixed to the shaft and meshes with the bevel gear wheel 23. The sprocket wheel 26 is fixed to the end of the shaft 24. The sprocket wheel 27 is fixed to the end of the axle 28 of the follow wheel 2. The sprocket chain 29 passes around the sprocket wheels 26 and 27.

From the foregoing description, it is obvious that as the implement is drawn over the ground, that rotary motion is transmitted from the axle 28 through the sprockets 27 and 36 and chain 29; shaft 24, bevel gears 25 and 23 to the shaft 20.

Having described by invention, what I claim as new and desire to secure by Letters Patent is:—

A fertilizer distributer comprising a hopper having an outlet, coöperating valves located in planes one above the other, one of which is adapted to be adjusted to approximately regulate the hopper outlet, and the other valve adapted to be moved to close the hopper outlet, a lever mechanism coöperating with the last said valve, each of said valves having rearwardly extending shanks provided with elongated registering perforations, a bolt passing through said perforations, a cross piece receiving said bolt, said bolt having a shoulder adapted to impinge the shank of the upper valve against the cross piece, the shank of the lower valve being free for longitudinal movement with relation to said bolt.

In testimony that I claim the foregoing as my own, I have hereto affixed my signature in the presence of two witnesses.

JOHN C. SPARKS.

Witnesses:
  W. P. WOODARD,
  T. G. HAMMOND.

Copies of this patent may be obtained for five cents each, by addressing the "Commissioner of Patents, Washington, D. C."